United States Patent
Chen et al.

(10) Patent No.: US 7,599,103 B2
(45) Date of Patent: *Oct. 6, 2009

(54) OPTICAL CARRIAGE OF SCANNER AND METHOD OF THE SAME

(76) Inventors: Tsung-Yin Chen, 1, Lane 7, Shi-Men St., Hsin-Chu (TW); Chun-I Hsiao, 4F, No. 104, Lane 1050, Ming-Hu Rd., Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 11/498,580

(22) Filed: Aug. 2, 2006

(65) Prior Publication Data
US 2007/0035786 A1 Feb. 15, 2007

Related U.S. Application Data

(63) Continuation of application No. 10/166,750, filed on Jun. 12, 2002, now Pat. No. 7,133,164.

(51) Int. Cl.
*H04N 1/04* (2006.01)

(52) U.S. Cl. .................. 358/474; 358/484; 358/483; 250/208.1; 399/118; 359/865; 355/66

(58) Field of Classification Search .................. 358/474, 358/497, 483, 496, 484; 250/208.1; 399/118; 359/872, 865; 355/11, 66
See application file for complete search history.

(56) References Cited

U.S. PATENT DOCUMENTS

| | | | | |
|---|---|---|---|---|
| 4,200,391 | A * | 4/1980 | Sakamoto et al. | 399/47 |
| 4,444,488 | A * | 4/1984 | Fujii et al. | 399/118 |
| 4,634,251 | A * | 1/1987 | Jonker | 396/573 |
| 4,634,261 | A * | 1/1987 | Nagoshi | 399/212 |
| 7,133,164 | B2 * | 11/2006 | Chen et al. | 358/474 |
| 7,508,603 | B2 * | 3/2009 | Masuda | 359/813 |

* cited by examiner

*Primary Examiner*—Houshang Safaipour
*Assistant Examiner*—Negussie Worku
(74) *Attorney, Agent, or Firm*—Stolowitz Ford Cowger LLP

(57) ABSTRACT

An optical carriage of scanner has a mirror assembly and a device assembly, the mirror assembly has a mirror mount, some mirror holder, and some supporters, and the device assembly has a chassis. In this invention, the mirror assembly and the device assembly are mechanically connected after separately formation. Further, to ensure correct shape of these mirror holders and these supporters, they could be formed by metal punch, plastic ejection, or plastic process.

22 Claims, 3 Drawing Sheets

| Separately form a mirror assembly and an element assembly. The mirrorassembly at least has the mirror mount, the supporter, and the mirrorholder. The element assembly at least has the chassis. | 21 |

↓

| Mechanically connect the mirror assembly with the element assembly | 22 |

OPTICAL CARRIAGE OF SCANNER AND METHOD OF THE SAME

CROSS-REFERENCE TO RELATED APPLICATIONS

This is a Continuation Patent Application of U.S. patent application Ser. No. 10/166,750, filed Jun. 12, 2002, now U.S. Pat. No. 7,133,164 titled "Optical Carriage of Scanner and Method for the Same", inventors Tsung-Yin Chen, Chun-I Hsiao.

BACKGROUND OF THE INVENTION

1. Field of the Invention

This invention generally relates to the optical carriage of scanner and method for forming the same, moreover, the invention relates to the following issues: reduces errors, simplifying construction, reducing cost and increasing precision.

2. Description of the Prior Art

The conventional scanner usually locates some mirrors in an optical carriage, thus, the location of the mirrors could be changed to achieve some predetermined functions by moving the optical carriage. Further, the mirror mount usually is a combination of an element assembly, which has a chassis, and a mirror assembly, which has a mirror mount and a support device. Herein, the mirror assembly is used to modify the propagation path of the light, and the element assembly is used to carry some elements for processing the light.

For example, the conventional scanner usually puts some mirrors in and on an optical carriage, and acquires the complete image by moving the optical carriage through the whole scanned document. In the example, the mirror assembly has some mirrors and a mount for fixing the mirrors, the element assembly has some devices, such as lens and charger coupled device, and a chassis for supporting and fixing both the devices and the mirror assembly.

The conventional technologies usually form the whole optical carriage, include the mirror mount and the supporters, by the plastic ejection, and then separately locate both mirrors and devices into the optical carriage. The advantages of the previous conventional technologies have low cost and simply fabrication.

However, because that the result of the plastic ejection is strongly dependent on the fabrication conditions which would be changed during the fabrication of different plastic ejection, the shape of the different optical carriages is hard to be exact similar. Further, because the whole optical carriage is formed at the same time, it is difficult to separately amend the details of the optical carriage. Thus, the shape and the position of the real supporters usually are different to the predetermined supporter, and both mirrors deviation and wrong propagation path of light are unavoidable. Moreover, because that the hardness and the rigidity of the plastic material is weak, because that the weight of the mirror is negligible, and because the supporters suffer extra stress during the moving process of the optical carriage, the supporters would be damaged and/or deformed even the fabrication is thorough prefect, and both mirrors deviation and wrong propagation path of light are unavoidable.

SUMMARY OF THE INVENTION

One main object of the invention is to provide an optical carriage of scanner, moreover, the provided invention have the following advantages such as low cost, low errors, simply fabrication, and high precision.

Another object of the invention is to provide an optical carriage of scanner, the provided invention could archive the previous advantages without strongly amending the conventional optical carriage of scanner.

Still an object of the invention is to provide a method for forming the previous provided optical carriage of scanner.

One preferred embodiment of this invention is an optical carriage of scanner, and is a combination of at least a mirror assembly and an element assembly. The mirror assembly at least has a mirror mount, some supporters and some mirror holders. These supporters are located and protruded mirror mount, and each supporter is separated from other, supporters. These mirror holders are located in and protruded the mirror mount, and each mirror holder has two terminals where one terminal is connected with the mirror mount but another terminal is separated from the mirror mount. The element assembly at least has a chassis which are divided into a device area and a separated mirror area. Wherein, because the mirror area is covered by the mirror assembly after the element assembly is connected with the mirror assembly, the shape of the mirror area usually equal to the shape of the mirror and the mirror area usually is located under the mirror assembly. Wherein, at least an element, such as lens, light sensor, and charger coupled device, is located inside the device area.

In this embodiment, the mirror assembly is mechanically connected with the element assembly. In fact, each assembly is formed and precisely amended before they are connected to form the whole optical carriage of scanner. Besides, to reduce the risk of deformation of both lens holders and supporters, the embodiment forms both lens holders and supporters by one or combination of the following: metal punch, plastic ejection, and plastic process.

BRIEF DESCRIPTION OF THE DRAWINGS

A more complete appreciation and many of the attendant advantages will be readily obtained as the same becomes better understood by reference to the following detailed description when considered in connection with the accompanying drawings.

DESCRIPTION OF THE PREFERRED EMBODIMENT

Regarding to the defects induced by the process that directly form the whole structure plastic ejection, and also regarding to the defects induced by the lack of separated amendment of the details, the invention solves the defects by a two-stage formation. In detail, the invention separately forms the mirror assembly and the element assembly without limiting how each assembly is formed, and then mechanically connects the mirror assembly with the element assembly. Thus, any defect induced by the plastic ejection could be prevent while the plastic ejection being replaced by other fabrication, and the details of each assembly could be separately amended during the formation of each assembly. Besides, because the mirror assembly and the element assembly do not share the same device for the conventional optical carriage of scanner, the two-stage formation of this invention not only would not change the structure and corresponding position of the assemblies, but also would not induce any extra difficulty to align.

Regarding to the defects induced by the week hardness and/or the week rigidity of the plastic material, especially regarding to the defects of damages and deformation, the invention solves the defects by changing the used material and the used fabrication. In detail, the invention could form the supporters and the mirror holders, even could form the whole mirror assembly, by monoblock cast, the invention also could form the supporters and the mirror holder, even could form the whole mirror assembly, by one of the following: metal punch, plastic ejection, and plastic ejection with the mechanically enhanced structure.

Figure 1A:
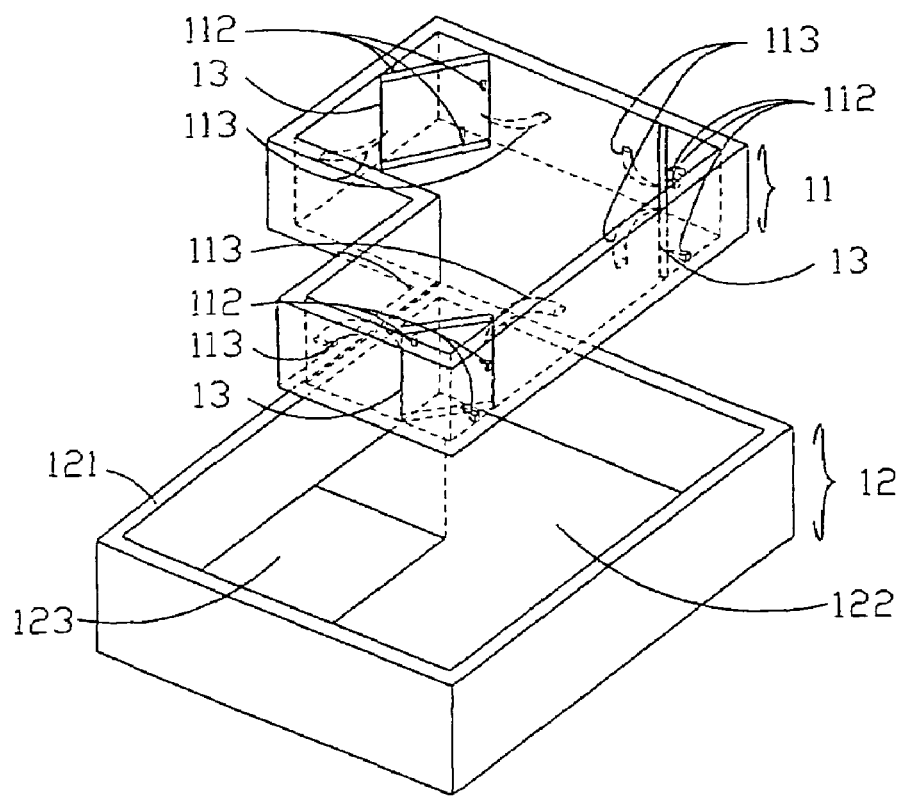
FIG. 1A to FIG. 1C show the essential structure of one preferred embodiment of this invention.
Figure 1B:
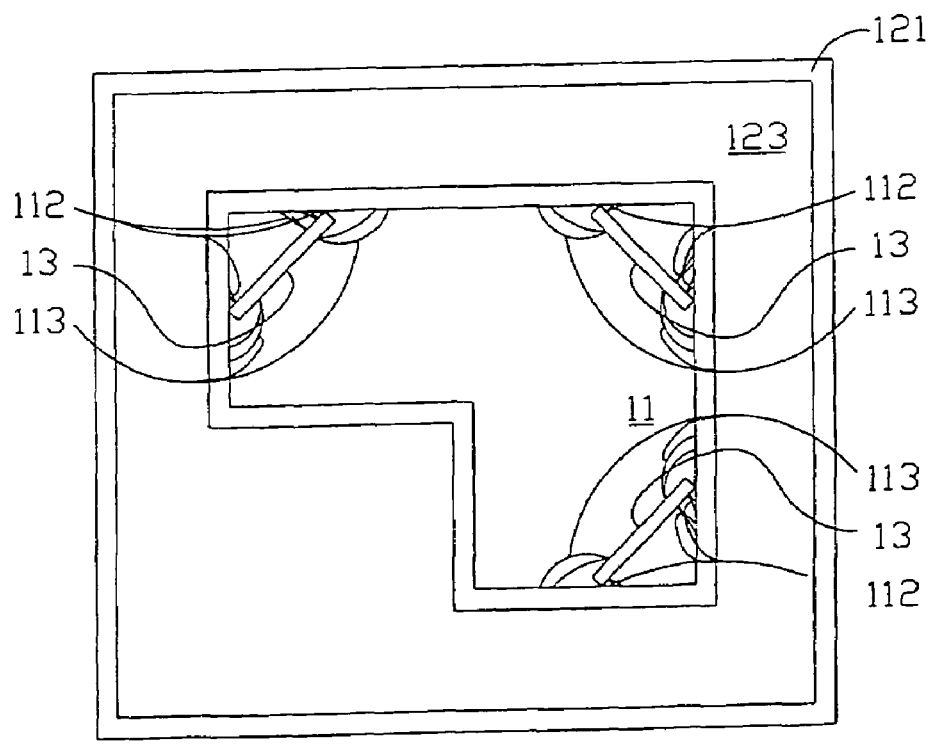
Figures 1C, 2A:
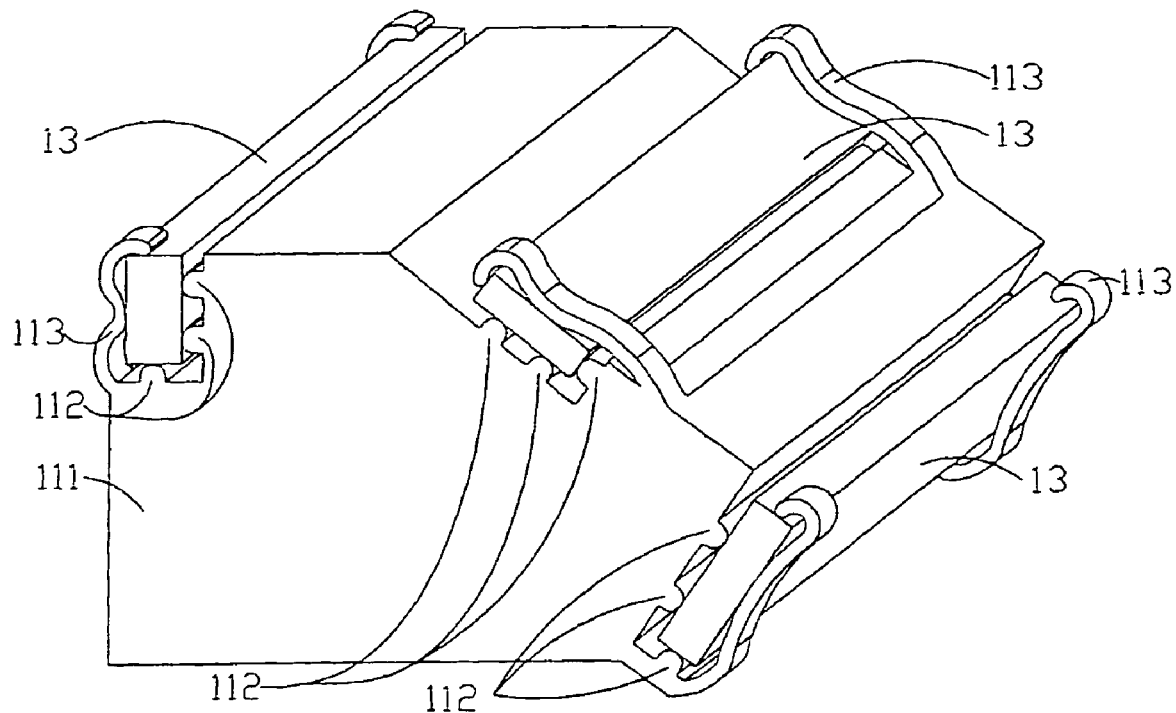
FIG. 2A to FIG. 2C show the essential flow-chart of another preferred embodiment of this invention.

One preferred embodiment of this invention is an optical carriage of scanner. As shown in FIG. 1A, FIG. 1B, and FIG. 1C, the embodiment at least has mirror assembly 11 and element assembly 12. Moreover, mirror assembly 11 at least has mirror mount 111, supporter 112, and mirror holder 113, and element assembly 12 at least has chassis 121. Certainly, the embodiment with three mirrors 13 only is an example, the embodiment never limits the shape of both mirror mount 111 and chassis 12, also never limits the number, the shape and the location of mirror 13, still never limits the number, the shape, and the location of both supporters 112 and lens holder 113.

Significantly, mirror mount 111 is used to restrict the location and relative location of all mirrors 13 which are supported by mirror assembly 11. In the embodiment, all supporters 112 are located and protruded mirror mount 111, and each supporter 112 are separated from other supporters 112. Further, all mirror holders 113 also are located and protruded mirror mount 111, and each mirror holder 113 has two terminals where one terminal is directly connected with mirror mount 111 and another terminal is separated from mirror mount 111. Surely, the invention only requires that each mirror 13 is fixed in mirror mount 111 by at least two lens holder 113 which are not located on the same side of the mirror 13, and requires that each mirror 13 is supported on mirror mount 111 by at least three supporters 112. The reasons of these requirements are three points determine a plane and two points determine a line.

Further, element assembly 12 has chassis 121 which could be divided into separate device area 123 and mirror area 122. Wherein, mirror assembly 11 is located inside mirror area 122, and at least an element, such as lens, charger coupled device, light sensor, or integrated circuit, is located inside device area 123.

One main characteristic of this embodiment is that element assembly 12 are mechanically connected with mirror assembly 11 after they are formed separated, but not are formed with mirror assembly 11 as a whole at the same time. Wherein, the available mechanical connection between mirror assembly 11 and element assembly 12 is one or combination of the following: hook, insert, weld, adherence, hinge, and nail. Herein, because that the embodiment does not limit the details of the mechanical connection, all figures omit the used mechanical connection. However, it should be noted that the used mechanical connection should not damage or block the propagation of light between different mirrors 13 inside mirror assembly 11, also should not damage or block the propagation of light inside element assembly 12.

Further, to simplify the fabrication, the embodiment could form mirror assembly 11 by the monoblock cast. Moreover, to prevent deformation of supporters 112 and mirror holders 113, the embodiment could enhance the hardness and rigidity of both supporters 112 and mirror holders 113 by form mirror assembly 11 with one or combination of the following technologies: metal punch, plastic ejection, and plastic ejection with the mechanically enhanced structure.

Furthermore, while the shape of optical carriage of scanner let the conventional technologies can not precisely form required supporters 112 and mirror holders 113, the embodiment could replace the step of forming whole mirror assembly 11 with the use of monoblock cast by the step of forming both supporters 112 and mirror holders 113 with the use of monoblock cast to precisely amend the details of supporters 112 and mirror holders 113. Certainly, to prevent deformation of supporters 112 and mirror holders 113, the embodiment could enhance the hardness and rigidity of both supporters 112 and mirror holders 113 by form mirror assembly 11 with one or combination of the following technologies: metal punch, plastic ejection, and plastic ejection with the mechanically enhanced structure.

Besides, because mirror holders 113 are used to fixed mirrors 13 on mirror mount 111, the width of a gap between any mirror holder 113 and mirror mount 111 should be equal to or slightly less than the thickness of one mirror which is supported by the mirror holder 113. Surely, to easily insert and effectively hold mirror 13, mirror holders 113 usually are made of the elastic material.

Moreover, it should be emphasized that the main characteristic of this embodiment is that mirror assembly 11 and element assembly 12 are separately formed and connected by mechanical connection. In contrast, how mirror assembly, especial supporters 112 and mirror holders 113, is formed, what material is used, and what shape is formed only in some minor characteristics of the embodiment.

However, the invention is not limited by the embodiment. For example, while the shape of the optical carriage of scanner could be precisely formed by plastic ejection but mirror assembly 11, especial supporters 112 and mirror holders 113, is trend to be deformed during the operation of the optical carriage, the invention could only amend the formation and the material of mirror assembly 11, especial supporters 112 and mirror holders 113. In the case, the invention does not concern whether mirror assembly 11 and element assembly 12 is separated formed or formed by monoblock cast.

Another preferred embodiment is a method for forming the optical carriage of a scanner, especially for forming the preferred embodiment. As FIG. 2A shows, the embodiment at least has following essential steps:

As separately formation block 21 shows, separately form a mirror assembly and an element assembly. The mirror assembly at least has the mirror mount, the supporter, and the mirror holder. The element assembly at least has the chassis.

As mechanical connection block 22 shows, mechanically connect the mirror assembly with the element assembly.

In the embodiment, the available mechanical connection between the mirror assembly and the element assembly is one or combination of the following: hook, insert, weld, adherence, hinge, and nail. However, the embodiment does not limit the details of the mechanical connection.

In additional, the mirror mount is used to limit the location of each mirror and relative location of the different mirror, and both the supporters and the mirror holders are used to fix all mirrors in the predetermined location of the mirror mount. The chassis usually is divided into a device area and a mirror area, wherein mirror assembly is located inside the mirror device and at least an element is located inside the device area. However, the embodiment does not limit the details of both assemblies, no matter shape, material or fabrication.

For example, the embodiment could form the mirror assembly by the monoblock cast, or by one or combination of the followings: metal punch, plastic ejection and plastic process. For example, the embodiment could form both the supporters and the mirror holders by the monoblock cast, or by one or combination of the following; metal punch, plastic ejection and plastic process.

For example, the embodiment could but not need to let the supporters be located and protruded the mirror mount and let each supporter be separated from other supporters. For example, the embodiment could but not need to let the mirror holders be located and protruded the mirror mount and let each mirror holder has one terminal directly connected with the mirror mount and has another terminal separate from the mirror mount.

Figure 2B:
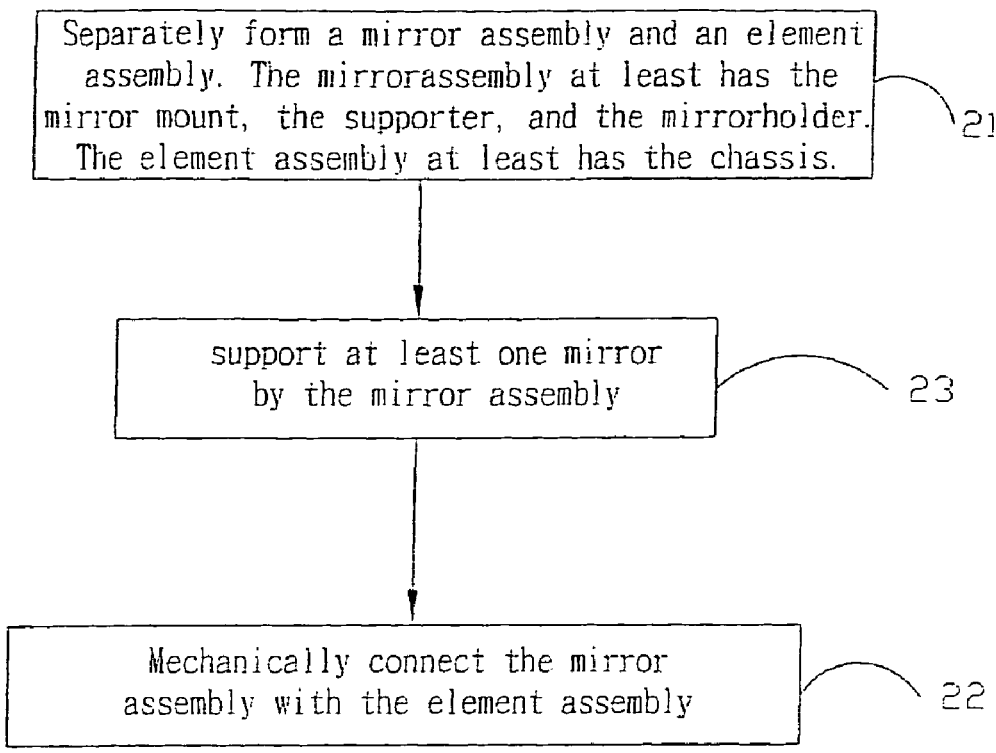
Figure 2C:
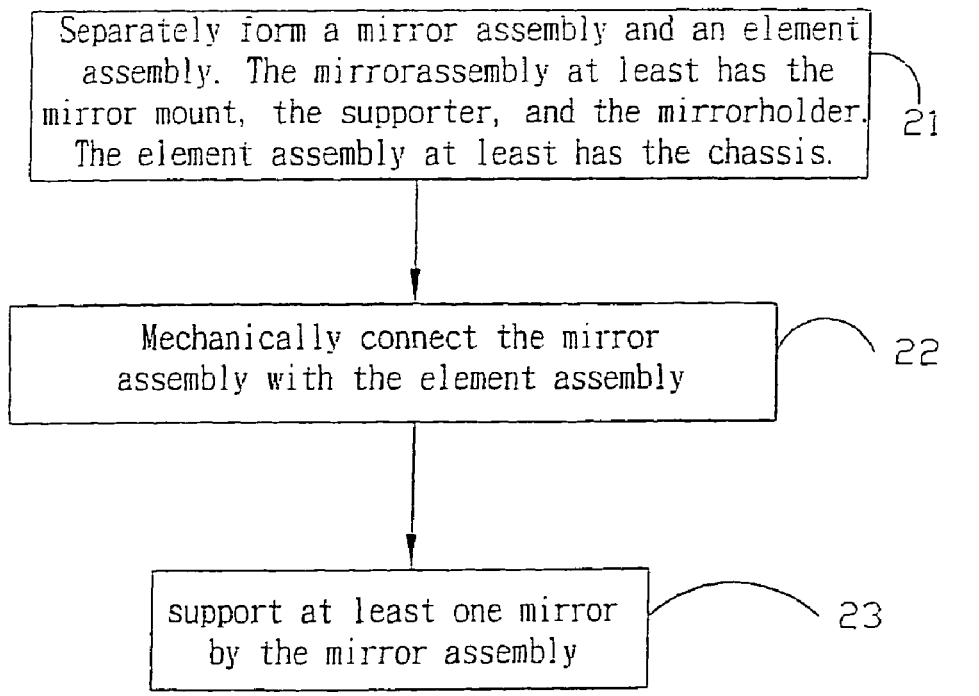

Besides, because that the optical carriage of scanner usually has at least one mirror, as FIG. 2B shows, the embodiment could perform mirror combination block to support at least one mirror by the mirror assembly before perform mechanical connection block 22 to mechanically connect the mirror assembly and the element assembly. Certainly, as FIG. 2C shows, the invention also perform mechanical connection block 22 to mechanically connect the mirror assembly and the element assembly before perform mirror combination block to support at least one mirror by the mirror assembly.

From the foregoing it will be appreciated that, although specific embodiments of the invention have been described herein for the purpose of illustration, various modifications may be made without deviating from the spirit and scope of the invention. Accordingly, the invention is not limited except as by the appended claims.

What is claimed is:

1. A mirror carriage, comprising:
   at least one set of supporters contacting a mirror at three or more points; and
   at least one mirror holder comprising at least a first and a second terminal, wherein the first terminal contacts a first surface of the mirror and the second terminal contacts a second surface of the mirror, and wherein the mirror holder is configured to cooperate with the at least one set of supporters to fix the mirror in place.

2. The mirror carriage of claim 1, further comprising three groups, wherein each group includes two sets of supporters and two sets of mirror holders.

3. The mirror carriage of claim 2, further comprising three mirrors arranged in an associated group of two sets of supporters and two sets of mirror holders.

4. The mirror carriage of claim 3, wherein the three mirrors are arranged in an associated group of two sets of supporters and two sets of mirror holders to form an optical path between the three mirrors.

5. The mirror carriage of claim 1, wherein the width of a gap between the supporter and the mirror holder is substantially equal to the thickness of the mirror.

6. The mirror carriage of claim 1, wherein the mirror holders comprise elastic material.

7. The mirror carriage of claim 1, wherein the at least one set of supporters contact at least a third surface and a fourth surface of the mirror.

8. A scanner, comprising:
   a chassis; and
   an optical assembly positioned in the chassis, wherein the optical assembly includes:
   at least one supporter configured to contact a mirror at three or more points; and
   at least one mirror holder comprising at least a first and a second terminal, wherein the first terminal is configured to contact a first surface of a mirror and the second terminal is configured to contact a second surface of the mirror, and wherein the mirror holder and the supporter are configured to fix the mirror to the optical assembly.

9. The scanner of claim 8, wherein the at least one supporter and at least one mirror holder comprise a mirror assembly.

10. The scanner of claim 8, further comprising three groups, wherein each group includes two sets of supporters and two sets of mirror holders.

11. The scanner of claim 10, further comprising three mirrors arranged on the mirror assembly, wherein one or more of the three mirrors is arranged in an associated group of two sets of supporters and two sets of mirror holders.

12. The scanner of claim 11, wherein the three mirrors are arranged on the mirror assembly to form an optical path between the three mirrors.

13. The scanner of claim 8, further comprising an electronic element positioned in the chassis.

14. The scanner of claim 8, wherein the width of a gap between the mirror holder and the mirror mount is substantially equal to the thickness of a mirror supported by the mirror holder.

15. The scanner of claim 8, wherein the mirror holders comprise elastic material.

16. The scanner of claim 8, wherein the at least one set of supporters contact at least a third surface and a fourth surface of the mirror.

17. An apparatus, comprising:
    means for contacting a mirror at three or more points; and
    means for supporting the mirror with at least a first and a second terminal, wherein the first terminal is configured to contact a first surface of the mirror and the second terminal is configured to contact a second surface of the mirror, and wherein the means for contacting and the means for supporting are configured to fix the mirror in place.

18. The apparatus of claim 17, further comprising
    means for positioning at least one mirror on the at least one mirror holder.

19. The apparatus of claim 17, further comprising
    means for forming three groups, wherein each group includes two sets of supporters and two sets of mirror holders.

20. The apparatus of claim 17, further comprising
    means for positioning the optical assembly in a scanner chassis.

21. The apparatus of claim 17, further comprising
    means for positioning an electronic element in the scanner chassis.

22. The apparatus of claim 17, wherein the at least one set of supporters contact at least a third surface and a fourth surface of the mirror.

* * * * *

UNITED STATES PATENT AND TRADEMARK OFFICE
CERTIFICATE OF CORRECTION

PATENT NO. : 7,599,103 B2
APPLICATION NO. : 11/498580
DATED : October 6, 2009
INVENTOR(S) : Tsung-Yin Chen et al.

It is certified that error appears in the above-identified patent and that said Letters Patent is hereby corrected as shown below:

On the Title page, Item (54) and Col. 1 lines 1-2
(Title): Delete "OPTICAL CARRIAGE OF SCANNER AND METHOD OF THE SAME" and replace with -- OPTICAL CARRIAGE OF SCANNER AND METHOD FOR THE SAME --;

Item (76)
line 4 (Inventors): Delete "Lane 7" and replace with -- Lane 74 --.

Signed and Sealed this

Sixteenth Day of November, 2010

David J. Kappos
*Director of the United States Patent and Trademark Office*